(No Model.)
P. T. BEACH.
ANIMAL TRAP.
No. 384,415. Patented June 12, 1888.
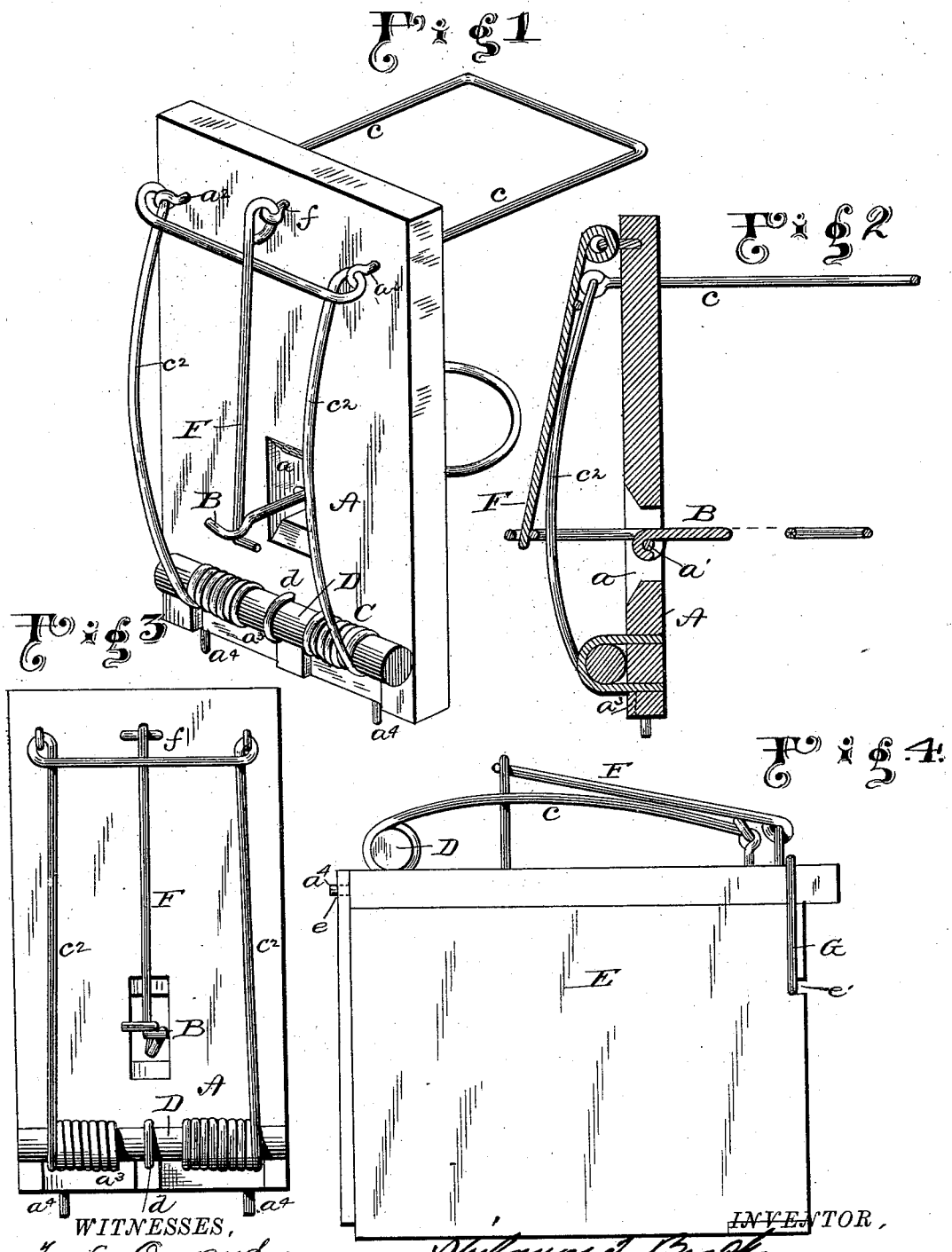
WITNESSES,
J. L. Ourand.
M. J. Chamblie.
INVENTOR,
Philemon T. Beach.
C. H. Watson & Co. Attorney
N. PETERS, Photo-Lithographer, Washington, D. C.

UNITED STATES PATENT OFFICE.

PHILEMON THEODORE BEACH, OF LULING, TEXAS.

ANIMAL-TRAP.

SPECIFICATION forming part of Letters Patent No. 384,415, dated June 12, 1888.

Application filed April 2, 1888. Serial No. 269,619. (No model.)

*To all whom it may concern:*

Be it known that I, PHILEMON THEODORE BEACH, a citizen of the United States, residing at Luling, in the county of Caldwell and State of Texas, have invented certain new and useful Improvements in Traps; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

My invention relates to improvements in that class of traps specially adapted to catch gophers, prairie-dogs, and salamanders—a species of animals that are very wily and hard to entrap, and which to a great extent are devastating many parts of the West and Southwest, especially Texas.

The objects of my improvements are, first, to provide a trap that can be inserted in their holes and, if necessary, covered with sand and dirt, and yet so constructed and arranged that it is almost impossible for the animal to get out without being caught, and, second, to provide a simple combination for said trap whereby it can be used to catch rats, &c. I attain these objects by the mechanism illustrated in the accompanying drawings, in which—

Figure 1 is a perspective view of my trap with the trigger set. Fig. 2 is a sectional longitudinal view. Fig. 3 is a rear transverse view. Fig. 4 is a side view of the box part, which may be attached when it is desired to catch rats, &c.

A designates the piece to which is attached the means whereby the animal is caught. The piece A is constructed with the opening $a$, having the cross-piece $a'$, upon which is pivoted the trigger B. The piece A is also provided with the holes or orifices $a^2$, in which operate the vertical wires $c$ of the spiral springs C. There are reduced portions $a^3$ in the rear end of the piece A, which are adapted to said spiral springs—that is, the spirals C are partly buried or countersunk within the reduced portions $a^3$ of the piece A. There are also two studs or projecting ends, $a^4$, in the rear end of the piece A, for the purpose of attaching the rear end of the box E to the piece A. This is accomplished by means of the studs $a^4$ being inserted in the holes $e$ of the box E.

The trigger B is constructed as shown in Fig. 2, and is pivoted upon the cross-piece $a'$, located in the opening $a$ of the piece A.

D represents the rod which extends across the rear end of the piece A. This rod D is held securely in position by means of a staple, $d$, which is driven through the piece A and riveted to it. The rod D strengthens and gives elasticity to the spiral springs C, which are made of strong elastic wire and helically coiled upon said rod, having one end, $c'$, inserted in the piece A, and the other end, $c^2$, extending forward and uniting with the upright pieces $c$.

F is the wire used in setting the trigger B. Said wire is secured in the center of the piece A by means of a screw-eye, $f$.

The box E is constructed as shown in Fig. 3, and provided with the holes $e$ and the slots $e'$. It is attached to the piece A by means of the studs $a^4$ being inserted in the holes $e$, having wire G placed over the screw-eye $f$ and the lower ends, $g$, adjusted into the slots $e'$, as shown in Fig. 5.

It is always best to rigidly attach a piece of sweet-potato to the trigger B. The scent of the potato will always attract the gopher, prairie-dog, or salamander.

The trap can be used with or without the box E. It is best to dispose of said box in catching salamanders, &c., because when the platform is detached therefrom it rests flat upon the soil, with the choker extending through the burrow. The trap can then be more easily placed in an upright position in the hole or burrow and hidden in the dirt or sand.

It being evident that my invention is very practical, inexpensive, and simple in construction, as well as effectual in operation, it is useless to further enlarge upon its merits.

Having fully described my invention, what I claim as new, and desire to secure by Letters Patent, is—

1. In a trap for gophers and the like, a platform having a rod or bar secured upon its upper face, and around which are coiled the ends of the choke-spring for increasing the tension of the same, in combination with the trigger, choker, and bait-hook, substantially as described.

2. In an animal-trap, a platform having a rod or bar secured to its upper face, and having the ends of the choke-spring coiled thereon, pins or prongs extending from one edge of the platform for engagement with a side of a box, a box having one of its sides elevated above the others, against which the pronged end of the platform abuts for engagement therewith, and having recesses in its opposite ends for the reception of a loop, which passes thence over the free end of the platform for binding the same to the box, substantially as described.

In testimony whereof I affix my signature in presence of two witnesses.

PHILEMON THEODORE BEACH.

Witnesses:
G. A. WILLIAMS,
T. E. COERSHAM.